United States Patent
Ford et al.

(10) Patent No.: US 10,661,784 B2
(45) Date of Patent: May 26, 2020

(54) OPERATING METHODS AND SYSTEM FOR A DRIVELINE DISCONNECT CLUTCH

(71) Applicant: Ford Global Technologies, LLC, Dearborn, MI (US)

(72) Inventors: Stuart Ford, Farmington Hills, MI (US); Corey Blue, Ypsilanti, MI (US); Todd McCullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/889,782

(22) Filed: Feb. 6, 2018

(65) Prior Publication Data
US 2019/0241175 A1     Aug. 8, 2019

(51) Int. Cl.
| | | |
|---|---|---|
| *B60W 20/40* | (2016.01) | |
| *B60W 20/10* | (2016.01) | |
| *B60W 10/184* | (2012.01) | |
| *B60W 10/10* | (2012.01) | |
| *B60W 10/08* | (2006.01) | |
| *B60W 10/06* | (2006.01) | |
| *B60W 10/02* | (2006.01) | |
| *B60K 6/48* | (2007.10) | |

(52) U.S. Cl.
CPC ............ *B60W 20/40* (2013.01); *B60W 10/02* (2013.01); *B60W 10/06* (2013.01); *B60W 10/08* (2013.01); *B60W 10/10* (2013.01); *B60W 10/184* (2013.01); *B60W 20/10* (2013.01); *B60K 6/48* (2013.01); *B60K 2006/4825* (2013.01); *B60W 2510/0275* (2013.01); *B60W 2510/081* (2013.01); *B60W 2710/021* (2013.01); *B60W 2710/0644* (2013.01); *B60W 2710/081* (2013.01); *B60W 2710/1005* (2013.01); *B60W 2710/18* (2013.01); *B60Y 2200/92* (2013.01); *Y10S 903/93* (2013.01); *Y10S 903/945* (2013.01); *Y10S 903/946* (2013.01); *Y10S 903/947* (2013.01)

(58) Field of Classification Search
CPC ...... B60W 20/40; B60W 10/02; B60W 10/06; B60W 10/08; B60W 10/184; B60W 10/10; B60W 20/10; B60W 2510/0275; B60W 2510/081; B60W 2710/021; B60W 2710/0644; B60W 2710/081; B60W 2710/1005; B60W 2710/18; B60Y 2200/92; Y10S 903/93; Y10S 903/945; Y10S 903/946; Y10S 903/947; B60K 6/48; B60K 2006/4825
USPC .......................................................... 701/22
See application file for complete search history.

(56) References Cited

U.S. PATENT DOCUMENTS

| | | |
|---|---|---|
| 9,039,570 B2 | 5/2015 | Doering et al. |
| 9,108,614 B2 | 8/2015 | Doering et al. |
| 9,156,469 B2 | 10/2015 | Gibson et al. |

(Continued)

*Primary Examiner* — Marthe Y Marc-Coleman
(74) *Attorney, Agent, or Firm* — David Kelley; McCoy Russell LLP (57) ABSTRACT

Systems and methods for operating a driveline of a hybrid vehicle are presented. In one example, the systems and methods determine a driveline disconnect boost time during vehicle operating conditions when it may be less noticeable. The driveline disconnect boost time may then be used to close a driveline disconnect clutch in a way that may reduce torque disturbances through the driveline.

19 Claims, 5 Drawing Sheets

(56) References Cited

U.S. PATENT DOCUMENTS

| | | | |
|---|---|---|---|
| 9,527,505 B1 | 12/2016 | Gibson et al. | |
| 2013/0296124 A1* | 11/2013 | Pietron | B60W 20/40 477/5 |
| 2014/0330469 A1* | 11/2014 | Yoshida | B60W 10/06 701/22 |
| 2015/0274155 A1* | 10/2015 | Nefcy | B60W 10/02 192/3.58 |
| 2016/0032990 A1* | 2/2016 | Nedorezov | B60W 20/40 477/5 |

* cited by examiner

OPERATING METHODS AND SYSTEM FOR A DRIVELINE DISCONNECT CLUTCH

FIELD

The present description relates to methods and a system for improving operation of a driveline disconnect clutch of a vehicle. The methods and system may be particularly useful for hybrid vehicles that include an engine, electric machine, and a driveline disconnect clutch.

BACKGROUND AND SUMMARY

A driveline disconnect clutch may be used to selectively couple and decouple an engine to a transmission. The driveline disconnect clutch may be positioned in a driveline or powertrain between the engine and an electric machine. If the driveline disconnect clutch is closed quickly, a torque disturbance may be felt by vehicle occupants. One way to close the driveline disconnect clutch may be to request a torque transfer capacity from the driveline disconnect clutch. The torque transfer capacity of the driveline disconnect clutch is an amount of torque that may be transferred by the driveline disconnect clutch. The driveline disconnect clutch torque transfer capacity may be adjusted by changing a pressure of a fluid that applies a pressure or force to close the driveline disconnect clutch. If the application pressure to driveline disconnect clutch torque transfer capacity relationship is incorrect, the driveline disconnect clutch may transfer more or less torque than is requested. Consequently, a driveline torque disturbance may be observed when the driveline disconnect clutch is closed. However, even if the driveline disconnect clutch application pressure to driveline disconnect clutch torque capacity relationship is accurate when the driveline clutch is closing, a driveline torque disturbance may be felt by vehicle occupants because of dynamics related to a time between when the driveline disconnect clutch is commanded to provide a torque capacity and a time when the driveline disconnect clutch is actually able to provide the commanded driveline disconnect clutch torque capacity.

The inventors herein have recognized the above-mentioned issues and have developed a driveline operating method, comprising: requesting adjustment of a driveline disconnect clutch boost time via a controller; applying a pressure to close a driveline disconnect clutch in response to the request; and adjusting the driveline disconnect clutch boost time according to a time between the applying of the pressure and an indication of torque transfer through a driveline disconnect clutch.

By determining and adjusting a driveline disconnect clutch boost time, it may be possible to provide the technical result of compensating for driveline disconnect clutch dynamics so that a desired driveline clutch torque capacity may be provided in a timely manner. In particular, a driveline disconnect clutch boost time may be determined so that compliance between clutch plates may be reduced before torque transfer across the driveline disconnect clutch is desired so that when the driveline disconnect clutch is commanded to transfer a particular amount of torque. The driveline disconnect clutch's torque capacity may then follow the desired or commanded driveline disconnect torque capacity without a delay that may be attributable to removing compliance (e.g., increasing the stiffness of the clutch by removing spacing between clutch plates) within the driveline disconnect clutch. Further, if the driveline is commanded to close to start the engine responsive to vehicle conditions, torque applied to the driveline via driveline torque sources may compensate for the known driveline disconnect clutch boost time by allowing the driveline disconnect clutch boost time to elapse before increasing the ISG torque to start the engine. Alternatively, if the engine is already started and running, adjustments to engine torque may compensate for the driveline disconnect clutch boost time by adjusting engine torque responsive to or after the driveline disconnect boost time elapses. In these ways, torque delivery to the driveline may be timely delivered so that there may be less possibility of driveline torque disturbances.

The present description may provide several advantages. For example, the approach may provide improved vehicle noise, vibration, and harshness. Further, the approach may reduce degradation of driveline components. Additionally, the approach may improve driveline disconnect clutch control.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
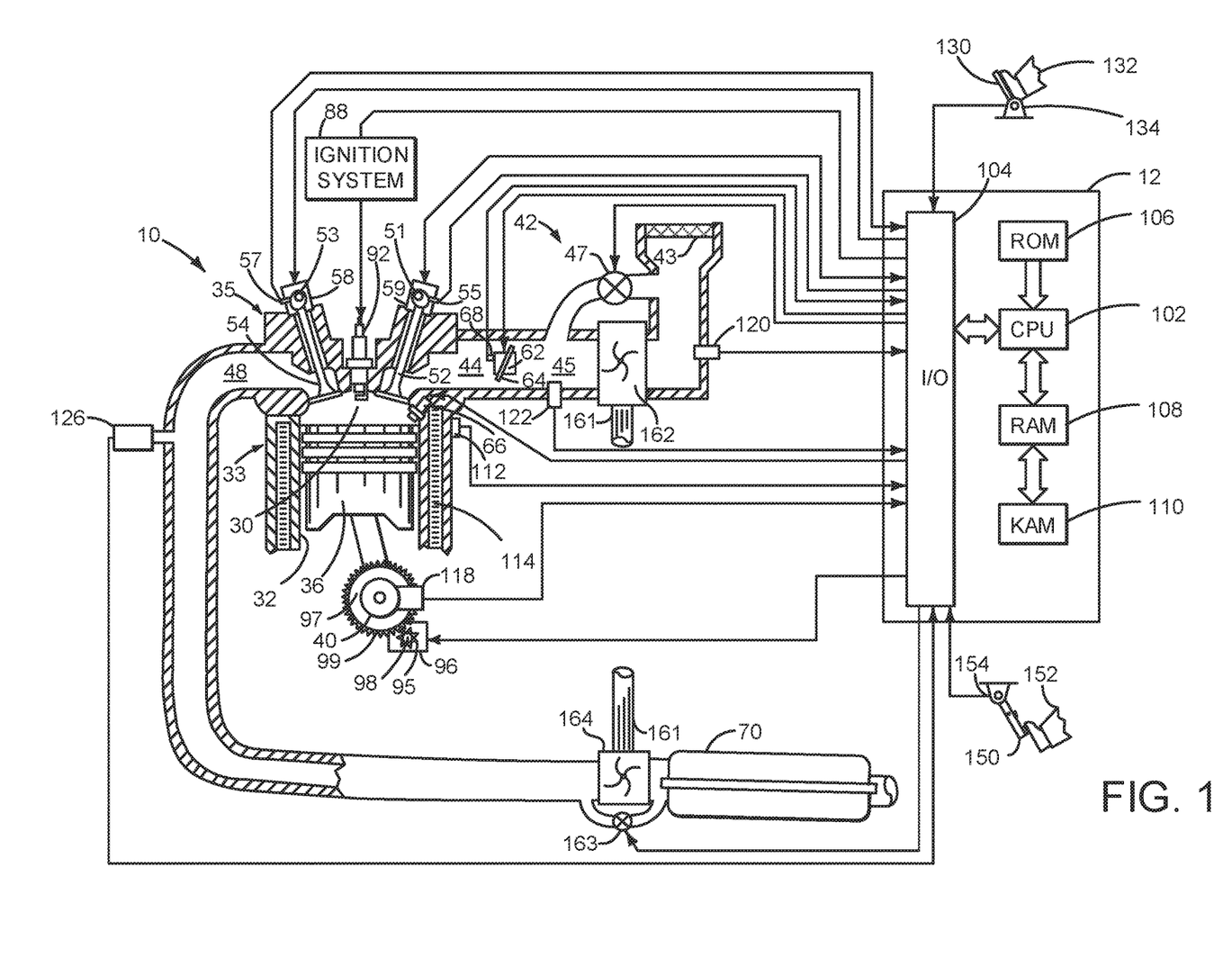
FIG. 1 is a schematic diagram of an engine.
Figure 2:
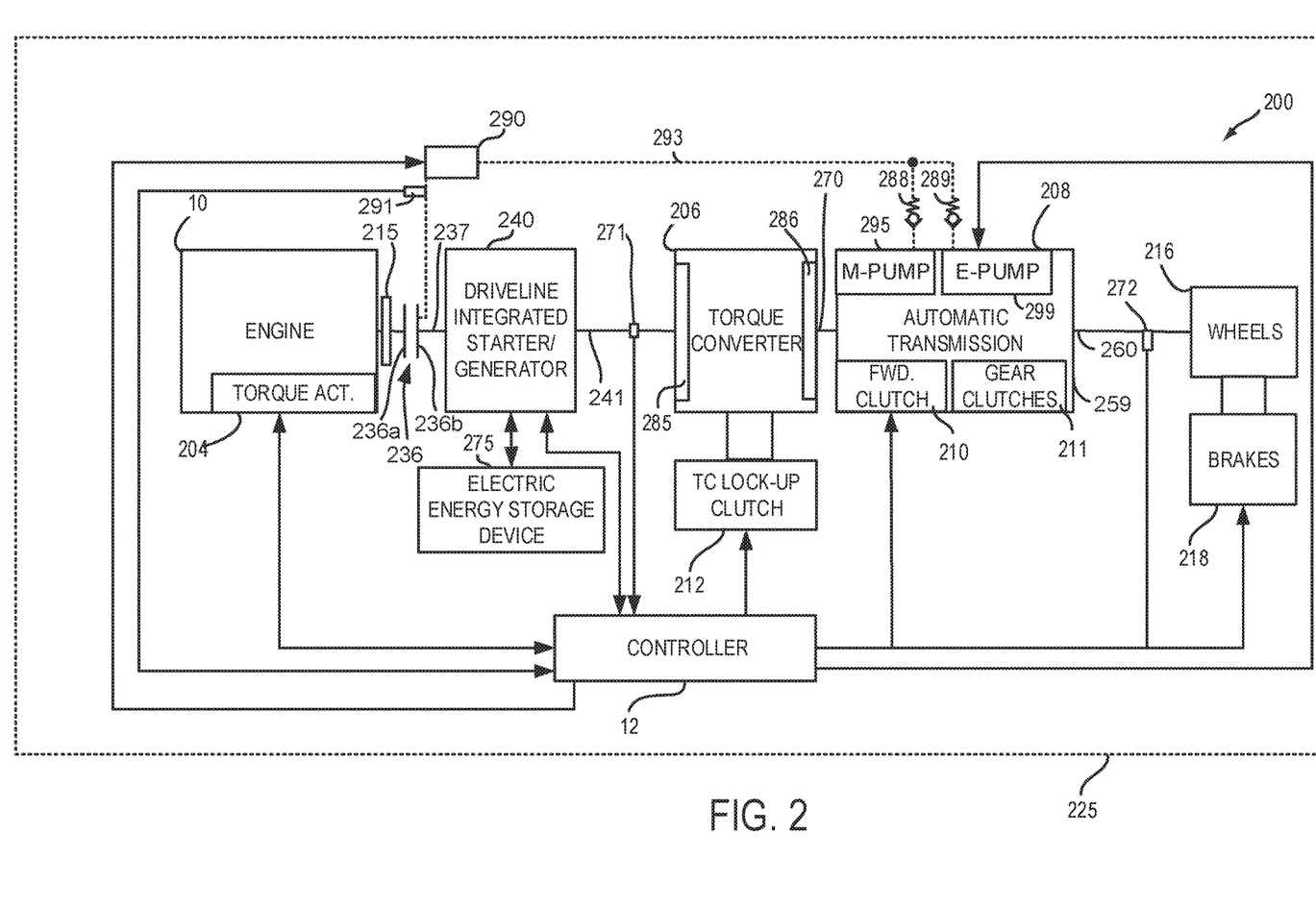
FIG. 2 is a schematic diagram of a hybrid vehicle driveline including the engine of FIG. 1.
Figure 3:
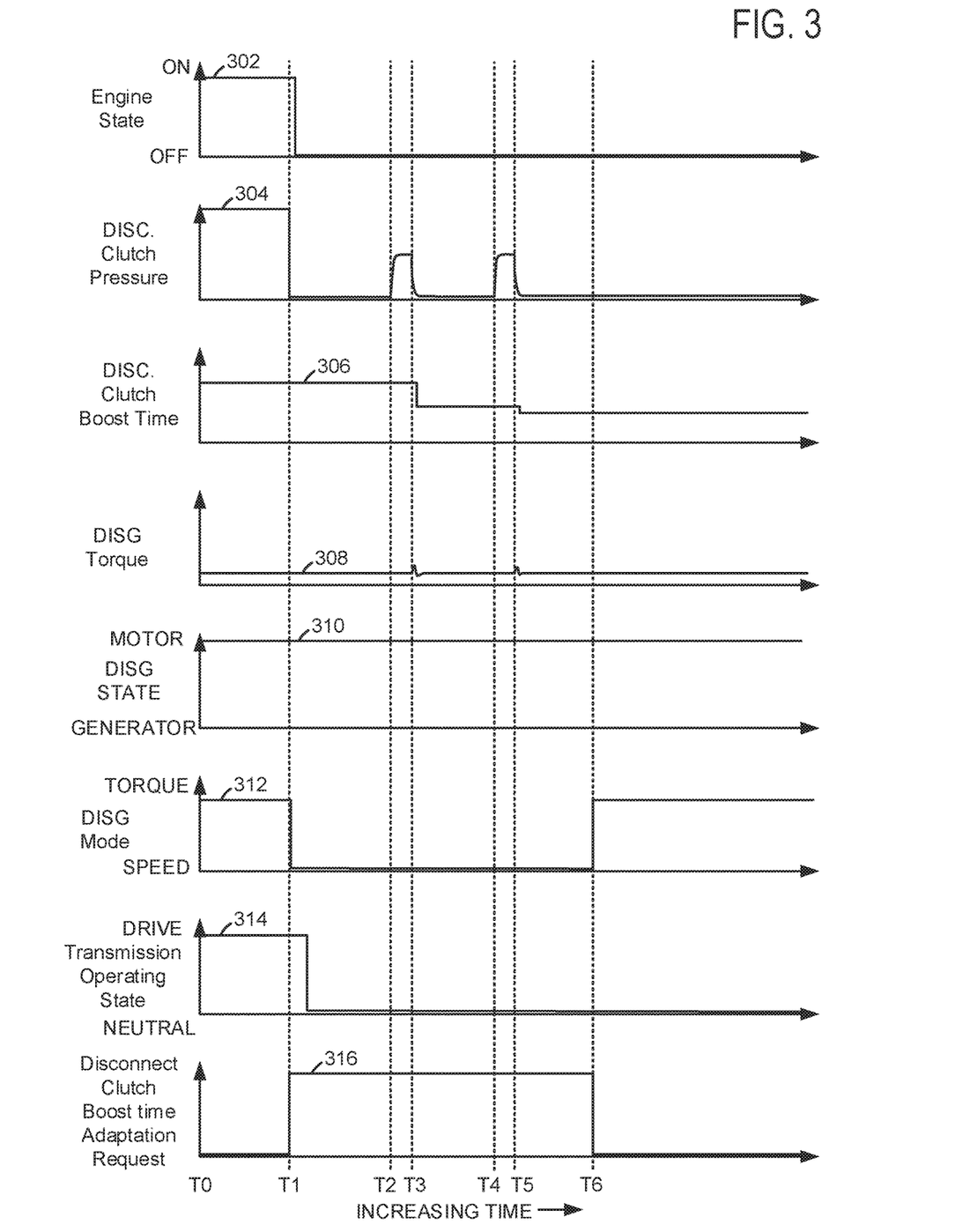
FIG. 3 is an example operating sequence for the hybrid driveline.
Figure 4:
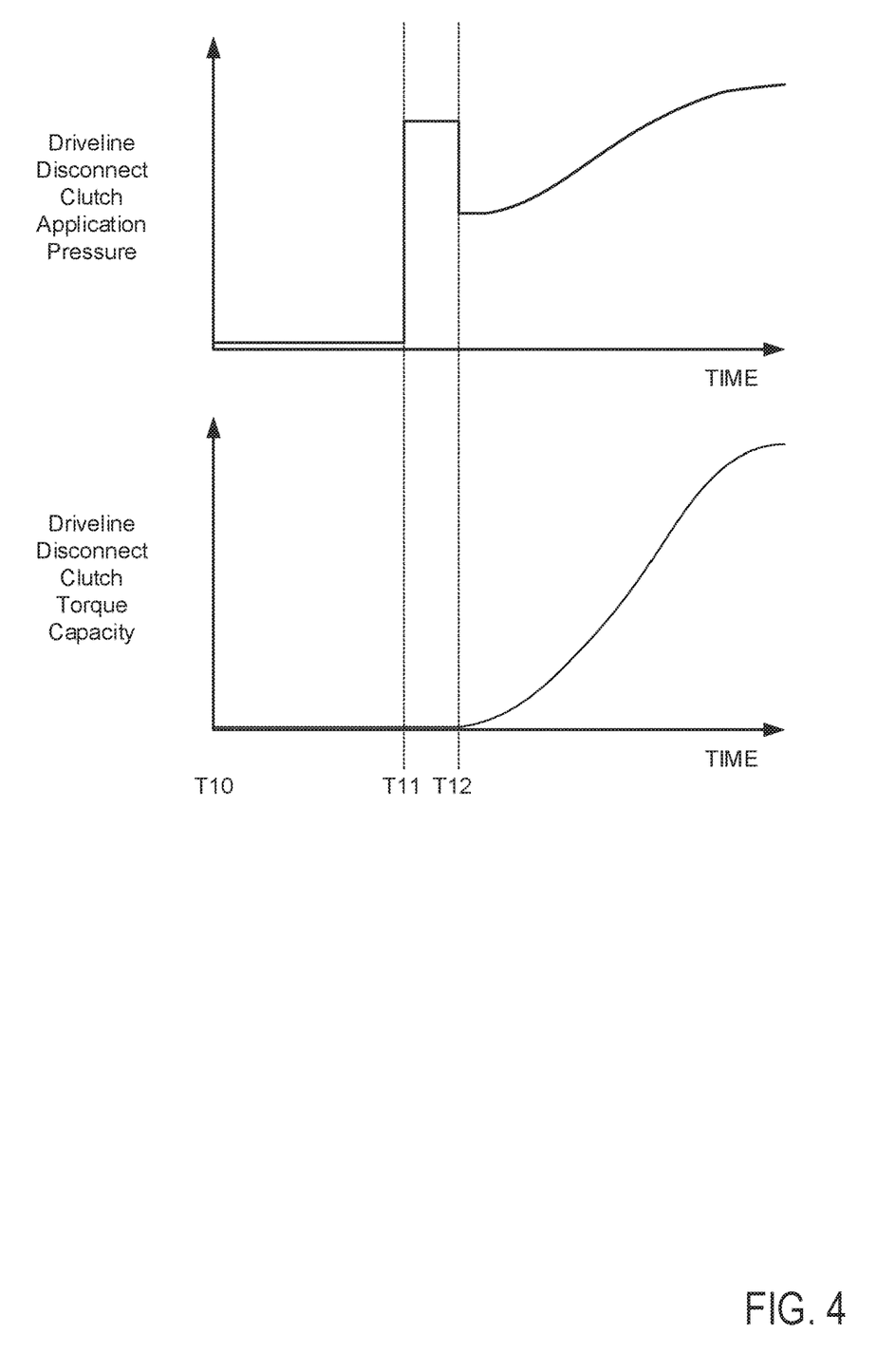
FIG. 4 is plot illustrating driveline disconnect closing when the driveline disconnect clutch boost time is not being determined.

The present description is related to characterizing and operating a driveline disconnect clutch of a hybrid vehicle. The hybrid vehicle may include an engine as is shown in FIG. 1. The engine of FIG. 1 may be included in a powertrain or driveline as is shown in FIG. 2. The driveline may be operated according to the sequence of FIG. 3 to characterize operation of a driveline disconnect clutch. Driveline disconnect clutch boost time and driveline disconnect clutch torque capacity for a driveline disconnect clutch closing event are shown in FIG. 4. The method of FIG. 5 may be the basis for operating the driveline as is shown in FIG. 3.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG.

1 to adjust engine operation based on the received signals and instructions stored on a memory of the controller.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. Hydraulic conduits or lines are shown by dotted lines. Electrical and mechanical connections are shown via solid lines.

The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side 236a of driveline disconnect clutch 236 through dual mass flywheel 215. Disconnect clutch 236 may be electrically or hydraulically actuated. In this example, disconnect clutch 236 may be operated via fluid supplied from mechanically driven transmission fluid pump 295 or electrically driven transmission fluid pump 299. Check valves 288 and 289 allow fluid to flow from mechanically driven transmission fluid pump 295 and electrically driven transmission fluid pump 299 to variable force solenoid 290 via conduit 293. Check valves 288 and 289 also prevent fluid backflow to mechanically driven transmission fluid pump 295 and electrically driven transmission fluid pump 299. Pressure of fluid supplied to driveline disconnect clutch 236 is monitored by controller 12 via pressure sensor 291. The output side 236b of driveline disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his/her foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 receives DISG position via position sensor 271 which also indicates the position of shaft 241 and mechanically driven transmission fluid pump 295. Controller 12 may convert transmission input shaft position into input shaft speed via differentiating a signal from position sensor 271. Controller 12 may receive transmission output shaft torque from torque sensor 272. Alternatively, sensor 272 may be a position sensor or torque and position sensors. If sensor 272 is a position sensor, controller 12 differentiates a position signal to determine transmission output shaft velocity. Controller 12 may also differentiate transmission output shaft velocity to determine transmission output shaft acceleration.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

Thus, the system of FIGS. 1 and 2 provide for a system, comprising: an engine; an electric machine; a driveline disconnect clutch positioned between the engine and the electric machine; a transmission coupled to the electric machine; and a controller including executable instructions stored in non-transitory memory that cause the controller to operate the electric machine in a speed control mode and that cause the controller to cease engine rotation while performing a driveline disconnect clutch boost time adjustment procedure. The system includes where the driveline disconnect clutch boost time is a time beginning when a pressure is applied to closed the driveline disconnect clutch and a time when an initial indication of torque transfer through the driveline disconnect clutch is provided. The system further comprises additional instructions to adjusting the driveline disconnect clutch boost time according to a time between starting to apply a pressure to the driveline disconnect clutch and an indication of torque transfer through the driveline disconnect clutch. The system includes where the indication of torque transfer through the driveline disconnect clutch is a change in speed of the electric machine. The system includes where the indication of torque transfer through the driveline disconnect clutch is an increase of electric current supplied to the electric machine. The system further comprises additional instructions to close the driveline disconnect clutch via applying a pressure to the driveline disconnect clutch for a duration of the driveline disconnect clutch boost time, then reducing the pressure.

Referring now to FIG. 3, a driveline operating sequence is shown. The driveline operating sequence of FIG. 3 may be provided via the system of FIGS. 1 and 2. The driveline operating sequence may also be provided based on the method of FIG. 5.

The first plot from the top of FIG. 3 is a plot of engine operating state versus time. The vertical axis represents engine operating state (e.g., on—rotating and combusting air and fuel; or off—not rotating and not combusting air and fuel). The engine is off when the trace is at a lower level near the horizontal axis. The engine is on when the trace is at a higher level near the vertical axis arrow. The horizontal axis represents time and time increases from the left side of the plot to the right side of the plot. Trace 302 represents engine state.

The second plot from the top of FIG. 3 is a plot of driveline disconnect clutch application pressure of fluid supplied to the driveline disconnect clutch versus time. The driveline disconnect clutch pressure is equivalent to transmission line pressure or transmission pump outlet pressure when the variable force solenoid is commanded open. The vertical axis represents pressure of fluid supplied to the driveline disconnect clutch and pressure supplied to the driveline disconnect clutch increases in the direction of the vertical axis arrow. The horizontal axis represents time and time increases from the left side of the plot to the right side of the plot. Trace 304 represents driveline disconnect clutch pressure.

The third plot from the top of FIG. 3 is a plot of a driveline disconnect clutch boost time parameter or variable value that is stored in controller memory. The driveline disconnect clutch boost time value increases in the direction of the vertical axis arrow. The driveline disconnect boost time value is zero at the level of the horizontal axis. The horizontal axis represents time and time increases from the left side of the plot to the right side of the plot. Trace 306 represents driveline disconnect clutch boost time.

The fourth plot from the top of FIG. 3 is a plot of driveline integrated starter/generator (DISG) torque versus time. The vertical axis represents DISG torque and DISG torque increases in the direction of the vertical axis arrow. The horizontal axis represents time and time increases from the left side of the plot to the right side of the plot. Trace 308 represents driveline disconnect clutch pressure.

The fifth plot from the top of FIG. 3 is a plot of driveline integrated starter/generator (DISG) state versus time. The vertical axis represents DISG state and DISG state may be motor or generator. The DISG provides positive torque to the driveline in motor mode and negative torque to the driveline in generator mode. The DISG is in motor mode when the trace is at a higher level near the vertical axis arrow. The DISG is in generator mode when the trace is at a lower level near the horizontal axis. The horizontal axis represents time and time increases from the left side of the plot to the right side of the plot. Trace 310 represents DISG operating state.

The sixth plot from the top of FIG. 3 is a plot of DISG control mode versus time. The vertical axis represents DISG control mode. The DISG control mode may be speed or torque. In speed control mode, DISG torque is allowed to vary while DISG speed is adjusted to a desired speed. The desired speed may be constant or varying over time. In torque control mode, DISG speed is allowed to vary while DISG torque is adjusted to a desired torque. The desired torque may be constant or varying over time. The DISG is in torque control mode when the trace is at a higher level near the vertical axis arrow. The DISG is in speed control mode when the trace is at a lower level near the horizontal axis. The horizontal axis represents time and time increases from the left side of the plot to the right side of the plot. Trace 312 represents DISG control mode.

The seventh plot from the top of FIG. 3 is a plot of transmission operating state versus time. The vertical axis represents transmission operating state. The transmission is in drive or a forward gear when the trace is at a higher level near the vertical axis arrow. The transmission is in park or neutral when the trace is at a lower level near the horizontal axis. The horizontal axis represents time and time increases from the left side of the plot to the right side of the plot. Trace 314 represents transmission operating state.

The eighth plot from the top of FIG. 3 is a plot of driveline disconnect clutch boost time adaptation request versus time. The vertical axis represents driveline disconnect clutch boost time adaptation request state. Driveline disconnect clutch boost time adaptation is requested when trace 316 is at a higher level near the vertical axis arrow. Driveline disconnect clutch boost time adaptation is not requested when trace 316 is at a lower level near the horizontal axis. Trace 316 represents driveline disconnect clutch boost time adaption request state.

At time T0, the engine is on and running, the drive line disconnect clutch is fully closed as indicated by the application pressure being at a high level. The DISG is operating as a motor in torque control mode and the DISG torque is at a lower level. The driveline disconnect clutch boost pressure value stored in memory is a higher level value and the DISG is operating in a torque control mode (e.g., DISG speed may vary while DISG torque is adjusted to follow a desired DISG torque). The transmission is engaged in drive and the driveline disconnect clutch boost time adaptation request is not asserted. Such conditions are indicative of the driveline propelling the vehicle down a road or when a vehicle is stopped with a brake applied.

At time T1, the driveline disconnect clutch boost time adaptation request is asserted responsive to vehicle operating conditions. The driveline disconnect clutch is opened by reducing driveline disconnect clutch application pressure and the DISG enters speed control mode in response to the request to adapt the driveline disconnect clutch boost time. The driveline disconnect clutch boost time remains at a higher level and the DSIG torque remains at its previous value. The DISG continues to operate as a motor and the transmission remains is shifted from drive to neutral shortly after the driveline disconnect clutch boost time adaptation request is asserted. The vehicle's brakes may also be engaged (not shown). The engine is stopped a short time after time T1 in response to the driveline disconnect clutch boost time adaptation request after the driveline disconnect clutch is opened so that the reduction in engine torque does not create a driveline torque disturbance.

At time T2, the DISC clutch application pressure is increased while the engine remains stopped. The driveline disconnect clutch boost time remains at its previous value and the DISG torque remains at its previous level. The DISG operates as a motor and it rotates one side of the driveline disconnect clutch. The opposite side of the driveline disconnect clutch is stopped since the engine is stopped. The DISG continues to operate in a speed control mode and the transmission is in park. The driveline disconnect clutch boost time adaptation request remains asserted.

At time T3, a disturbance of DISG torque is observed. The driveline disconnect clutch application pressure is decreased in response to the DISG torque increase. The DISG torque increases because the DISG is in speed control mode and the driveline disconnect clutch begins to transfer torque to the engine which is stopped. The torque transferred to the engine causes the DISG speed to drop momentarily until electrical current supplied to the DISG is increased, thereby increasing DISG torque to return the DISG's speed back to the desired DISG speed (e.g., a constant predetermined speed). The actual total amount of time from T2 to T3 may be an estimate of the driveline disconnect boost time when the driveline disconnect clutch application pressure shown between times T2 and T3 is applied to the driveline disconnect clutch. The driveline disconnect clutch boost time is updated in controller memory to the amount of time between time T2 and time T3 shortly after time T3. The DISG continues to operate as a motor and the transmission remains in neutral. The driveline disconnect clutch application pressure is reduced shortly after time T3 in response to the change in DISG torque. The driveline disconnect clutch application pressure is reduced so that the engine is not rotated via the DISG when the driveline disconnect clutch begins to transfer torque from the DISG. The driveline disconnect clutch boost time adaptation request remains asserted.

At time T4, the DISC clutch application pressure is increased a second time while the engine remains stopped. The driveline disconnect clutch boost time remains at its previous value and the DISG torque remains at its previous level. The DISG continues to operate as a motor and it rotates one side of the driveline disconnect clutch. The opposite side of the driveline disconnect clutch is stopped since the engine is stopped. The DISG continues to operate in a speed control mode and the transmission remains in park. The driveline disconnect clutch boost time adaptation request remains asserted.

At time T5, a second disturbance of DISG torque is observed. The driveline disconnect clutch application pressure is decreased in response to the second DISG torque increase. The amount of time between time T4 and T5 is slightly shorter than the amount of time between times T2 and T3. The DISG torque increases again because the DISG is in speed control mode and the driveline disconnect clutch begins to transfer torque to the engine which is stopped. The actual total amount of time from T4 to T5 may be a second estimate of the driveline disconnect boost time when the driveline disconnect clutch application pressure shown between times T4 and T5 is applied to the driveline disconnect clutch. The driveline disconnect clutch boost time is updated in controller memory to the amount of time between time T4 and time T5 shortly after time T5. The DISG continues to operate as a motor and the transmission remains in neutral. The driveline disconnect clutch application pressure is reduced shortly after time T5 in response to the change in DISG torque. The driveline disconnect clutch application pressure is also reduced so that the engine is not rotated via the DISG when the driveline disconnect clutch begins to transfer torque from the DISG. The driveline disconnect clutch boost time adaptation request remains asserted.

At time T6, the driveline disconnect clutch boost time adaptation sequence ends when the driveline disconnect clutch boost time adaptation request is withdrawn. The DISG is transitioned back into torque control mode and the driveline disconnect clutch application pressure remains at a lower level. The DISG remains operating as a motor and the transmission remains in neutral. The vehicle's brakes also remain engaged. The driveline disconnect clutch pressure also remains at a lower pressure.

In this way, driveline disconnect clutch boost time may be adapted to compensate for driveline disconnect clutch changes that may occur over time. The adapted driveline disconnect clutch boost time may be the basis for control of the various driveline torque actuators (e.g., the engine or the DISG).

Referring now to FIG. 4, an exemplary closing sequence for a driveline disconnect clutch is shown. The driveline disconnect clutch in this example is driveline disconnect clutch 236 shown in FIG. 2.

The first plot from the top of FIG. 4 shows driveline disconnect clutch application pressure versus time. The vertical axis represents driveline disconnect clutch application pressure (e.g., pressure of fluid supplied to close the driveline disconnect clutch). The horizontal axis represents time and time increases from the left side of the plot to the right side of the plot.

The second plot from the top of FIG. 4 shows driveline disconnect clutch torque capacity versus time. The vertical axis represents driveline disconnect clutch torque capacity (e.g., an amount of torque the driveline disconnect clutch may transfer based on the present driveline disconnect clutch application pressure). The horizontal axis represents time and time increases from the left side of the plot to the right side of the plot.

At time T10, the driveline disconnect clutch application pressure is zero. The driveline disconnect clutch is open when the driveline disconnect clutch application pressure is zero. The driveline disconnect clutch may be held open via one or more springs. The driveline disconnect clutch torque capacity is zero at time T10 since the driveline disconnect clutch application pressure is zero.

At time T11, the driveline disconnect clutch application pressure is increased to a predetermined pressure. The predetermined pressure may be a pressure that begins to remove compliance within the driveline disconnect clutch at a desired rate. The driveline disconnect clutch torque capacity is zero while compliance is being removed from the driveline disconnect clutch (e.g., while space between driveline disconnect clutch plates is being reduced). Time T11 is the beginning of the driveline disconnect clutch boost phase.

At time T12, driveline disconnect clutch torque capacity begins to increase and the driveline disconnect clutch application pressure is reduced so that the driveline disconnect clutch does not close faster than is desired. Time T12 is the end of the driveline disconnect clutch boost phase. The amount of time between time T11 and time T12 is the driveline disconnect clutch boost time. The driveline disconnect clutch boost time is the amount of time between when driveline disconnect clutch pressure is increased from a first pressure (e.g., zero gauge pressure) to a predetermined pressure and a time when the driveline disconnect clutch torque capacity begins to increase. After time T12, the driveline disconnect clutch pressure is gradually increased to provide a smooth gradual increase in the driveline disconnect clutch torque capacity.

Figure 5:
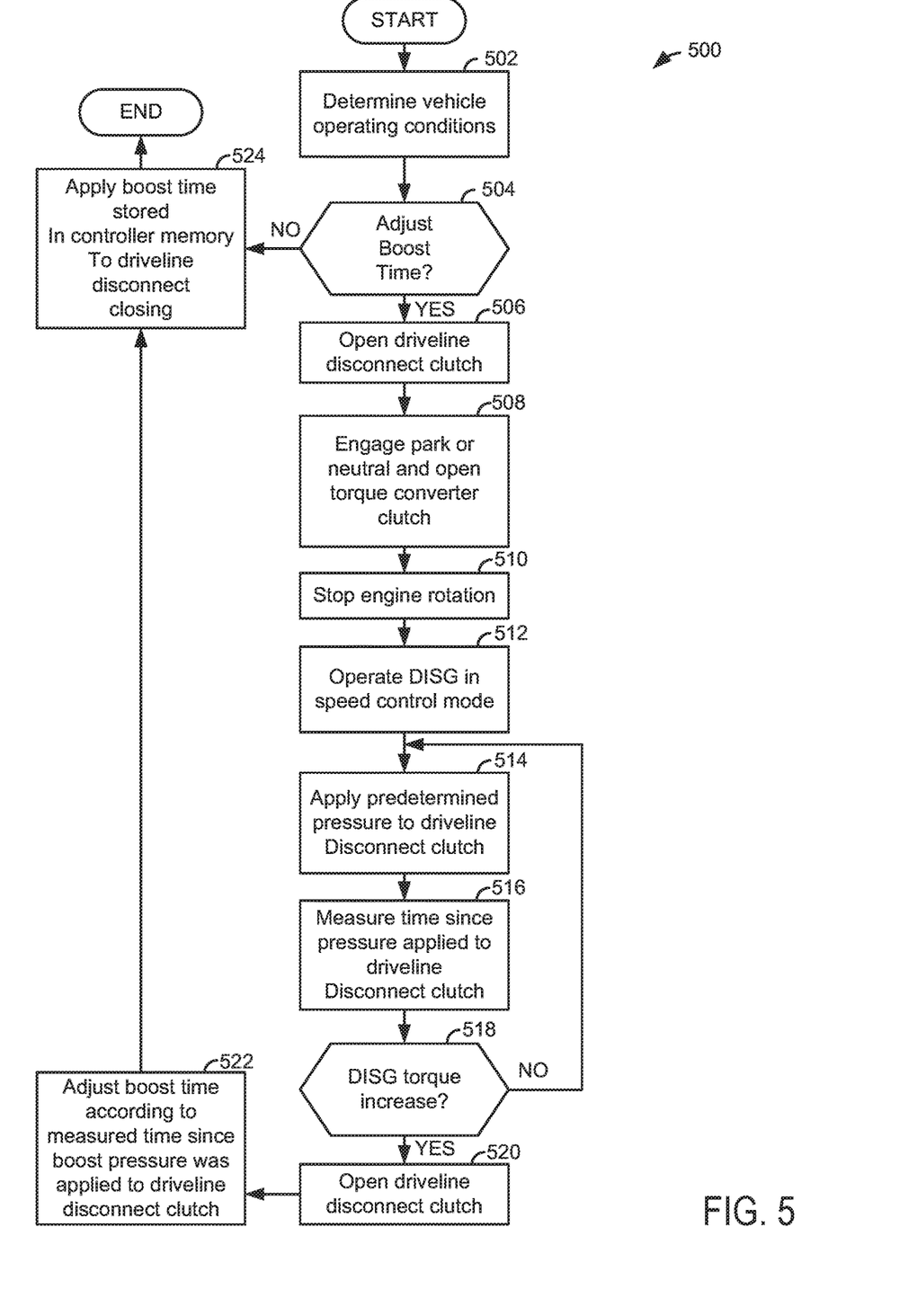
FIG. 5 is a method for operating the hybrid driveline.

Referring now to FIG. 5, a method for operating a driveline is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 3 and it may include instructions for operating the driveline at the conditions described herein.

At 502, method 500 determines vehicle operating conditions. Vehicle operating conditions (e.g., data) may be determined via receiving inputs as shown in FIGS. 1 and 2 into a controller. Vehicle operating conditions may include but are not limited to vehicle speed, engine speed, engine torque, driver demand torque, driveline disconnect clutch operating state, miles traveled by the vehicle, transmission operating state, driveline disconnect clutch application pressure, DISG speed, DISG torque, and ambient temperature. Method 500 proceeds to 504 after vehicle operating conditions are determined.

At 504, method 500 judges if the driveline disconnect clutch boost time is to be adjusted. In one example, method 500 may generate a request to adjust or adapt the driveline disconnect clutch boost time. The driveline disconnect clutch boost time may be a value stored in controller memory. Method 500 may judge that it is time to adjust the driveline disconnect clutch boost time in response to one or more of the following conditions: a distance traveled by the vehicle, the driveline disconnect clutch having been applied a predetermined number of times, and driver demand torque being less than a threshold torque. If method 500 judges that conditions for adjusting the driveline disconnect clutch boost time have been met, the answer is yes and method 500 proceeds to 506. Otherwise, the answer is no and method 500 proceeds to 524.

At 524, method 500 applies a driveline disconnect clutch boost pressure value stored in controller memory (e.g., volatile memory) to driveline disconnect clutch closing and to operation of other driveline torque sources. For example, if the driveline disconnect clutch boost time is 0.3 seconds and controller 12 judges that it may be desirable to begin transferring torque from the engine to the transmission two seconds in the future based on a rate of increase in driver demand torque, then the boost pressure may be applied to the driveline disconnect clutch 1.7 seconds in future from the present time so that torque transfer between the engine and the transmission may begin at precisely 2 seconds into the future from the present instant in time. In still another example, if controller 12 judges that it is time to start the engine via the DISG, then an increase in DISG torque to start the engine may be delayed 0.3 seconds (the boost time) from a time that a predetermined boost pressure is applied to the driveline disconnect clutch. By delaying the increase in DISG torque by the boost time, it may be possible to synchronize torque transferred via the driveline disconnect clutch from the DISG to the engine with the increase in DISG torque so that a driveline torque disturbance may be mitigated. In yet another example, if the engine is started and operating at idle speed while the DISG is propelling the vehicle, then controller 12 may delay an engine torque increase responsive to a driver demand torque increase for 0.3 seconds (e.g., the boost time) if controller 12 judges to close the driveline disconnect clutch so that the engine torque increase may be transferred to the vehicle's wheels instead of accelerating the engine while compliance from the driveline disconnect clutch is being removed. Method 500 proceeds to exit after applying the driveline disconnect clutch boost time stored in controller memory to driveline operation.

At 506, method 500 fully opens the driveline disconnect clutch by reducing driveline disconnect clutch application pressure. The driveline disconnect clutch may be supplied oil via a transmission pump. The oil supplied to the driveline disconnect clutch may stopped via closing a valve and driveline disconnect clutch application pressure may be reduced via opening a valve. Method 500 proceeds to 508 after the driveline disconnect clutch is opened.

At 508, method 500 may automatically shift the transmission into park or neutral so that DISG torque is not transferred to the vehicle's wheels. Operating the transmission in neutral or park reduces torque converter impeller torque to near zero so that DISG torque may be more directly related to driveline disconnect clutch torque transfer capacity. Further, if the transmission is shifted into neutral, method 500 may automatically apply vehicle brakes to keep the vehicle stationary while the driveline disconnect boost time is being determined. In one example, a vehicle parking brake may be applied to maintain vehicle position. In other examples, vehicle disc brakes may be applied to hold the vehicle's position. Method 500 proceeds to 510.

It should be mentioned that method 500 may be performed without shifting the transmission into park or neutral and maintaining the transmission in drive. However, the driveline disconnect clutch control parameter estimation may be improved by shifting the transmission to neutral or park. If the transmission is in drive, torque converter turbine impeller torque may be held constant by maintaining a constant amount of slip (e.g., speed difference between the torque converter impeller and torque converter turbine) across the torque converter and a constant torque converter clutch capacity while the DISG is maintained at a constant speed.

At 510, method 500 ceases engine rotating via stopping fuel flow to the engine. The engine may be stopped to provide a ground reference to which a small amount of torque from the driveline disconnect clutch may be transferred without rotating the engine. Method 500 proceeds to 512.

At 512, method 500 operates the DISG in a speed control mode. The DISG speed may be held constant while the DISG torque is varied to hold DISG speed at the constant predetermined speed value. In one example, DISG speed is closed loop controlled to a constant speed based on measured or actual DISG speed. Method 500 proceeds to 514 after the DISG enters speed control mode.

At 514, method 500 commands an increase in driveline disconnect clutch application pressure to stroke the driveline disconnect clutch (e.g., remove compliance or reduce gaps between clutch plates). In one example, the driveline disconnect clutch application pressure is increased to a threshold pressure, the threshold pressure a predetermined boost pressure that is expected to remove compliance in the driveline disconnect clutch at a predetermined rate. In some examples, the threshold pressure may be empirically determined via supplying and removing the threshold pressure from the driveline disconnect clutch. Method 500 proceeds to 516 after beginning to apply the threshold pressure. Note that the pressure applied to the driveline disconnect clutch is increased from a first pressure (e.g., zero or nearly zero gauge pressure) to the threshold pressure to determine the driveline disconnect clutch boost time. Method 500 proceeds to 516.

At 516, method 500 starts measuring an amount of time since the driveline disconnect clutch pressure was most recently increased from the first pressure to the threshold pressure. The amount of time may be stored in memory and the time may be updated at a predetermined rate (e.g., every 0.5 milliseconds). Method 500 proceeds to 518 after measuring the amount of time since the driveline disconnect clutch pressure was most recently increased from the first pressure to the threshold pressure.

At 518, method 500 judges if there has been in increase in DISG torque. Alternatively, method 500 may judge if there has been a decrease in DISG speed. The increase in DISG torque and the decrease in DISG speed may be indicative of torque being transferred through the driveline disconnect clutch. Torque transfer through the driveline disconnect clutch begins after compliance (e.g., space) between driveline disconnect clutch plates has been removed. Thus, the amount of time from when the driveline disconnect clutch pressure was most recently increased from the first pressure to the threshold pressure to the time when a torque disturbance of the DISG or a speed change of the DISG occurs may be determined by the controller as an estimate of the driveline disconnect clutch boost time. The amount of electrical current supplied to the DISG may be indicative of the amount of torque produced via the DISG. If method 500 judges that the DISG torque has increased or DISG speed has decreased, the answer is yes and method 500 proceeds to 520. Otherwise, the answer is no and method 500 returns to 514.

At 520, method 500 opens the driveline disconnect clutch by removing pressure applied to the driveline disconnect clutch. The pressure applied to the driveline disconnect clutch is removed as soon as torque begins to transfer across the driveline disconnect clutch so that the engine is not rotated. Engine rotation may not be desirable because the engine's known position may be lost. Further, the measure of time at 516 is stopped at its present value. Thus, the measured time (e.g., the driveline disconnect clutch boost time) is a total amount of time from when the driveline disconnect clutch pressure was most recently increased from the first pressure to the threshold pressure to the time when a torque disturbance of the DISG or a speed change of the DISG occurs. Method 500 proceeds to 522.

At 522, method 500 adjusts a driveline disconnect clutch boost time stored in controller memory if the value stored in memory deviates from the measured time or driveline disconnect clutch boost time by more than a predetermined amount (e.g., deviates by more than 5% from the value stored in controller memory). If the driveline disconnect clutch boost time determined at 518 deviates from the driveline disconnect clutch boost time stored in controller memory by more than the predetermined amount, then the driveline disconnect clutch boost time determined at 518 replaces the driveline disconnect clutch boost time stored in controller memory. In other words, the driveline disconnect clutch boost time determined at 518 over writes the value of driveline disconnect boost time stored in controller memory. If the driveline disconnect clutch boost time determined at 518 does not deviate from the driveline disconnect clutch boost time stored in controller memory by more than the predetermined amount, then the driveline disconnect clutch boost time stored in controller memory is not updated. Method 500 proceeds to 524.

In this way, the driveline disconnect clutch boost time may be updated or revised on controller memory. Further, the driveline disconnect clutch boost time may be applied as a control variable for adjusting driveline disconnect clutch operation and torque source operation.

Thus, the method of FIG. 5 provides for a driveline operating method, comprising: requesting adjustment of a driveline disconnect clutch boost time via a controller; applying a pressure to close a driveline disconnect clutch in response to the request; and adjusting the driveline disconnect clutch boost time according to a time between the applying of the pressure and an indication of torque transfer through a driveline disconnect clutch. The method includes where the driveline disconnect clutch is positioned between an engine and an electric machine. The method further comprises ceasing rotation of the engine in response to the requesting adjustment of the driveline disconnect clutch boost time. The method further comprises closing the driveline disconnect clutch in response to vehicle operating conditions and applying the pressure to stroke the driveline disconnect clutch for a duration of the driveline disconnect clutch boost time. The method further comprises reducing the pressure in response to the duration of the driveline disconnect clutch boost time expiring. The method further comprises opening the driveline disconnect clutch before closing the driveline disconnect clutch in response to requesting adjustment of the driveline disconnect clutch boost time. The method includes where the indication of torque transfer through the driveline disconnect clutch is an increase in current supplied to an electric machine. The method includes where the indication of torque transfer through the driveline disconnect clutch is a change of speed of an electric machine.

The method of FIG. 5 also provides for a driveline operating method, comprising: requesting adjustment of a driveline disconnect clutch boost time via a controller; engaging vehicle brakes and engaging a transmission into neutral or park in response to the request; applying a pressure to close a driveline disconnect clutch in response to the request; and adjusting the driveline disconnect clutch boost time according to a time between the applying of the pressure and an indication of torque transfer through a driveline disconnect clutch. The method further comprises ceasing rotation of an engine in response to the request. The method further comprises operating an electric machine in a speed control mode and rotating one side of the driveline disconnect clutch in response to the request. The method includes ceasing to apply the pressure in response to an indication of torque transfer through the driveline disconnect clutch. The method includes where the driveline disconnect clutch boost time is stored in memory of a controller. The method further comprises closing the driveline disconnect clutch in response to vehicle operating conditions and applying the pressure to stroke the driveline disconnect clutch for a duration of the driveline disconnect clutch boost time.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
   requesting adjustment of a driveline disconnect clutch boost time via a controller;
   applying a pressure to close a driveline disconnect clutch in response to the request; and
   adjusting the driveline disconnect clutch boost time according to a time between the applying of the pressure and an indication of torque transfer through the driveline disconnect clutch.

2. The method of claim 1, where the driveline disconnect clutch is positioned between an engine and an electric machine.

3. The method of claim 2, further comprising ceasing rotation of the engine in response to the requesting adjustment of the driveline disconnect clutch boost time.

4. The method of claim 3, further comprising closing the driveline disconnect clutch in response to vehicle operating conditions and applying the pressure to stroke the driveline disconnect clutch for a duration of the driveline disconnect clutch boost time.

5. The method of claim 4, further comprising reducing the pressure in response to the duration of the driveline disconnect clutch boost time expiring.

6. The method of claim 1, further comprising opening the driveline disconnect clutch before closing the driveline disconnect clutch in response to requesting adjustment of the driveline disconnect clutch boost time.

7. The method of claim 1, where the indication of torque transfer through the driveline disconnect clutch is an increase in current supplied to an electric machine.

8. The method of claim 1, where the indication of torque transfer through the driveline disconnect clutch is a change of speed of an electric machine.

9. A driveline operating method, comprising:
   requesting adjustment of a driveline disconnect clutch boost time via a controller;
   engaging vehicle brakes and engaging a transmission into neutral or park in response to the request;
   applying a pressure to close a driveline disconnect clutch in response to the request; and
   adjusting the driveline disconnect clutch boost time according to a time between the applying of the pressure and an indication of torque transfer through the driveline disconnect clutch.

10. The method of claim 9, further comprising ceasing rotation of an engine in response to the request.

11. The method of claim 9, further comprising operating an electric machine in a speed control mode and rotating one side of the driveline disconnect clutch in response to the request.

12. The method of claim 9, ceasing to apply the pressure in response to the indication of torque transfer through the driveline disconnect clutch.

13. The method of claim 9, where the driveline disconnect clutch boost time is stored in memory of the controller.

14. The method of claim 9, further comprising closing the driveline disconnect clutch in response to vehicle operating conditions and applying the pressure to stroke the driveline disconnect clutch for a duration of the driveline disconnect clutch boost time.

15. A system, comprising:
    an engine;
    an electric machine;
    a driveline disconnect clutch positioned between the engine and the electric machine;
    a transmission coupled to the electric machine; and
    a controller including executable instructions stored in non-transitory memory that cause the controller to operate the electric machine in a speed control mode and that cause the controller to cease engine rotation while performing a driveline disconnect clutch boost time adjustment procedure, and additional executable instructions that cause the controller to adjust the driveline disconnect clutch boost time according to a time between starting to apply a pressure to the driveline disconnect clutch and an indication of torque transfer through the driveline disconnect clutch.

16. The system of claim 15, where the driveline disconnect clutch boost time is a time beginning when a pressure is applied to close the driveline disconnect clutch and when an initial indication of torque transfer through the driveline disconnect clutch is provided.

17. The system of claim 15, where the indication of torque transfer through the driveline disconnect clutch is a change in speed of the electric machine.

18. The system of claim 15, where the indication of torque transfer through the driveline disconnect clutch is an increase of electric current supplied to the electric machine.

19. The system of claim 15, further comprising additional instructions to close the driveline disconnect clutch via applying the pressure to the driveline disconnect clutch for a duration of the driveline disconnect clutch boost time, then reducing the pressure.

* * * * *